June 29, 1965  A. M. DONOFRIO  3,192,063
METHOD OF FORMING DECORATIVE OBJECTS FROM
FOAMED THERMOPLASTIC RESINS
Filed Dec. 16, 1963
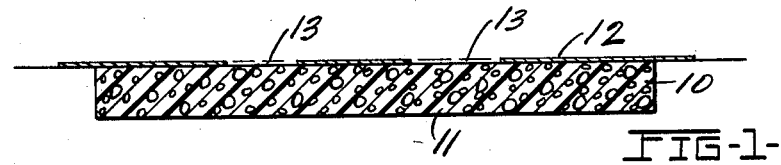
FIG-1-
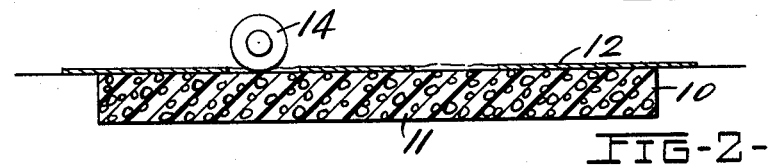
FIG-2-
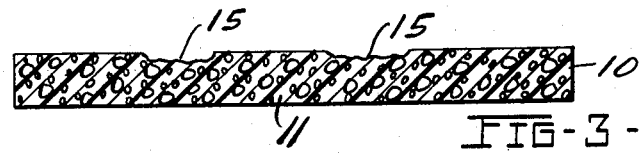
FIG-3-
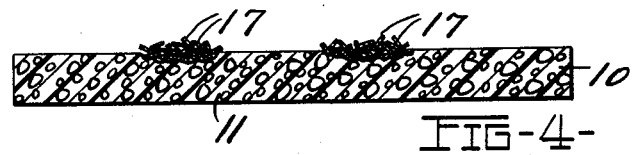
FIG-4-
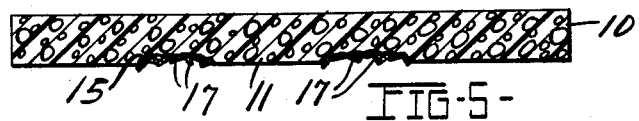
FIG-5-
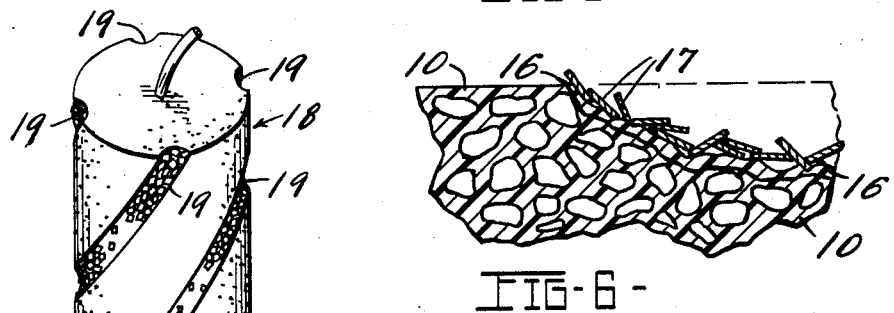
FIG-6-
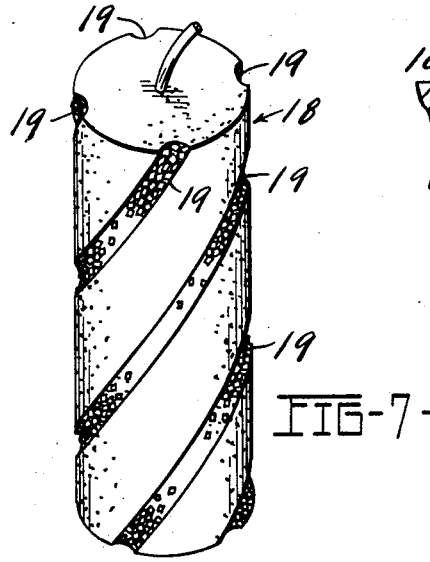
FIG-7-
INVENTOR:
ALFONSO M. DONOFRIO.
BY
Owen + Owen
ATT'YS

United States Patent Office 3,192,063
Patented June 29, 1965

---

3,192,063
METHOD OF FORMING DECORATIVE OBJECTS FROM FOAMED THERMOPLASTIC RESINS
Alfonso M. Donofrio, Toledo, Ohio, assignor to International Assemblix Corporation, Toledo, Ohio, a corporation of Illinois
Filed Dec. 16, 1963, Ser. No. 330,932
3 Claims. (Cl. 117—8.5)

The present invention relates to a new and improved method of making decorative objects such as signs from thermoplastic resins; and more particularly to a method of forming decorative objects from foamed thermoplastic resins, and to objects made therefrom.

An object of the present invention is the provision of a new and improved, fast and inexpensive method of manufacturing decorative objects, such as signs, displays, figures, and other objects, the decorated areas being sunken beneath the level of the remainder of the surface of the object.

A more particular object of the invention is the provision of a new and improved, fast and inexpensive method of manufacturing decorative objects such as signs, having a surface with sunken areas with decorative particles, such as glitter, attached to the surface of the depressed areas at various angles.

Another object of the instant invention is to provide a decorated object, such as a sign, figure, or other object, having depressed patterned decorative areas which may also have applied decoration material such as colored paint and/or particles, such as glitter or the like.

Further objects and advantages will become apparent to those skilled in the art to which the invention relates from the following description described with reference to the accompanying drawing forming a part of this specification, and in which:

FIGURE 1 is a fragmentary vertical sectional view through a board of plastic foam material having a silk screen stencil temporarily in place on its upper surface;

FIGURE 2 is a view similar to FIGURE 1, showing the application of a solvent to the areas of the plastic foam material exposed by the cut-out areas of the silk screen, in this case by a roller;

FIGURE 3 is a view similar to FIGURES 1 and 2 showing sunken areas whose cell structure has been collapsed by the solvent;

FIGURE 4 is a view similar to FIGURES 1, 2 and 3 and showing flat reflective particles, called "glitter" applied to the soft plastic layer at the bottom of the sunken areas;

FIGURE 5 shows the board inverted to dump excess glitter out of the sunken areas;

FIGURE 6 is an enlarged fragmentary view of a fragment of one of the sunken areas to whose surface particles of glitter are bonded; and FIGURE 7 is an oblique view of an imitation candle having spiraled sunken areas formed according to the invention.

According to the invention it has been found that very attractive displays, signs, figures, and the like, can be produced by applying a volatile solvent to defined areas of a surface of a body of foamed thermoplastic resin. The solvent dissolves the walls of the cells of the plastic adjacent the surface of the body to cause the cells to collapse. The solvent is thickened by the plastic which it dissolves, and the thickened solvent flows to the bottom of the next succeeding layer of cells below the surface of the body where it in turn dissolves the plastic forming the sidewalls of the cells, and the solution of the solvent and plastic becomes still thicker. It has been found that the dissolving action of the solution decreases as the solution becomes thickened, and this thickened solution dries into a thin skin at the bottom of the sunken areas. The bottoms of the sunken areas are irregular due to the cellular nature of the foamed plastic. In addition, when the solvent is applied to the top surface of the foamed plastic body, the side edges of the sunken areas tend to be somewhat rounded, inasmuch as the solvent that was applied adjacent to the side edges, penetrates sideways as well as downwardly into the foamed plastic.

In some instances an inert material, such as a pigment, may be mixed with the solvent, and in addition the inert material and solvent may include an additional resinous material to form a paint. Where an inert material, or inert material and resin are included with the solvent, the solvent evaporates less slowly, and the solvent appears to be absorbed out of the inert material to some degree by the foamed plastic; so that as the sidewalls of cells collapse, inert material is left in spaced apart areas with clear areas of plastic therebetween to provide a pleasing mottled effect.

While the solvent-plastic solution is in a tacky viscous condition, thin platelike particles of glitter, which may be colored, metallic or non-metallic particles which are inert relative to the solvent, are sprinkled into the depressed areas. The glitter is wetted by the viscous solvent-plastic solution. As the volative solvent vaporizes, it leaves the plastic redistributed as a tough skin at the surface of the sunken areas which bonds the glitter to the surfaces of the sunken areas. Inasmuch as the surfaces of the sunken areas are formed from collapsed cells of the foamed material, the surfaces are highly irregular, and the glitter that is bonded thereto is attached to the plastic at various angles. The result is that the glitter is bonded to the body in a highly random manner which causes spaced apart particles to reflect light from a source directly to a viewer regardless of the angle at which the body is held relative to the light source.

Example I

Referring to the drawing, a sign 10 was prepared on a flat surface of a piece of foamed polystyrene board 11 approximately ½" thick. The polystyrene material had an average cell size of approximately 1.0 mm. A silk screen stencil 12 having cutouts 13 removed from its inert backing material was placed on top of the surface of the foamed polystyrene board 11. The cutouts 13 were in the form of letters. A paint roller 14 having a conventional sheep skin surface was soaked in toluol and run back and forth over the surface of the silk screen 12 several times. Alternatively, the solvent may be applied by a paint brush, spraying, or the like. Thereafter the silk screen 12 was raised from the surface of the foamed polystyrene board 11. At this time the cell structure of the area to which the toluol was applied had begun to collapse to form sunken areas 15 in the shape of the desired letters and having a thickened layer of plastic 16 lining their surface. Glitter 17 formed from uniformly cut 1.0 mm. squares of an aluminum material having colored anodized coatings on both its major surfaces was sprinkled upon the surface of the board to fill the recesses. The toluol was allowed to completely dry and thereafter the board was inverted to shake out the excess glitter as seen in FIGURE 5. Substantially all areas of the depressions 15 forming the letters were completely coated with the glitter, the individual particles of which were randomly oriented and tightly bonded to the polystyrene by the plastic 16 which was now dried into a skin. Some of the glitter particles 17 were standing almost on end, others were positioned with a major surface generally parallel to the surface of the board, while still others were positioned at odd angles. None of the particles of glitter 17 appeared to have a coating of styrene on their outwardly facing surface, and the areas of the depressions adjacent the side edges of the letters were rounded as at 17. The sign so produced had a very pleasing effect and spaced particles of the glitter would glisten regardless of the angle which the sign was held relative to the viewer.

*Example II*

A sign was made in the same manner given above in Example I excepting that carbon tetrachloride was used as the solvent. The sign so produced was substantially identical with the one produced by the procedure described in Example I. The solvent appeared to dry more quickly, however, than did that used in Example I.

*Example III*

A sign was made using the same procedure and materials used in Example I excepting that an acrylic base paint was used in place of the toluol solvent. The paint consisted essentially of approximately 4.6 parts by weight of arylide red inert pigment, 2.4 parts by weight of bon red inert pigment, 42 parts by weight of a methyl methacrylate resin, 12 parts by weight of ethyl acetate, and 40 parts by weight of xylol. The paint was applied in the manner described in Example I so that a fairly thick coating covered the foamed polystyrene. The solvent in the paint dissolved the walls of the cells of the foam to provide sunken areas. As the solvent from the paint was absorbed by the cells of the foam to collapse the cells and form the sunken areas, the pigment remained agglomerated in spaced apart areas leaving substantially clear plastic between the areas of pigment to provide a pleasing mottled effect in the sunken areas of the sign.

*Example IV*

A sign was prepared as in Example III excepting that a glitter of substantially the same color as the pigment of the paint was poured into the sunken areas while the surface of the sunken areas was tacky. The glitter which did not adhere was removed by inverting the sign. The particles of glitter stuck to the bottom of the sunken areas in generally the same random fashion as described above in Example I. A solvent containing a pigment and thickened by a resin reduces the rate at which the solvent evaporates, and also serves the beneficial function of providing a coloring matter in areas where either the glitter may not completely cover, or areas where abrasion may subsequently remove the glitter.

*Example V*

FIGURE 7 of the drawing shows a generally cylindrical section 18 of foamed polystyrene shaped in the form of a candle. Four helical sunken strips 19 equally spaced around the periphery of the cylindrical section were formed, one at a time, by applying carbon tetrachloride to the surface with a narrow paint brush. After each sunken helical strip had been produced by the carbon tetrachloride, and while the surface of the sunken area was still tacky, glitter of one color was applied and the carbon tetrachloride was allowed to fully evaporate so that the glitter was firmly held in place. The process was repeated using a different color of glitter until helically sunken areas coated with red, green, silver and gold were produced. The resulting article had a very pleasant appearance and was highly decorative.

Where polystyrene foam is the material from which the decorative article is made, ketones, esters, aromatic hydrocarbons, and chlorinated hydrocarbons, or mixtures of any of these solvents with pigments and/or thickening resins, can be used to dissolve the polystyrene foam and form a sticky film of plastic at the bottom of the sunken areas which will bond inert particles to the polystyrene foam.

According to the invention, pleasing signs and decorative objects can be made from any foamed thermoplastic resin which can be dissolved by a volatile solvent. Polycarbonate foams can be dissolved by aromatic, and chlorinated hydrocarbons. Foams of copolymers of vinyl chloride and vinyl acetate can be dissolved by ketones and esters. Foamed materials of cellulose acetate and copolymers thereof, such as a copolymer of cellulose acetate and cellulose butyrate can be dissolved by ketones and esters.

The type of glitter or solid decorative material which is bonded to the surface of the sunken areas is relatively unimportant excepting that it should not be dissolved by the solvent for the plastic. Particles of aluminum, copper, gold, or silver can be used, as well as particles of colored glasses, minerals, and inorganic materials.

It will be apparent that a new and improved, fast and inexpensive method has been provided for producing decorative articles such as signs having sunken areas that resemble carvings and which are coated with pigments and/or glitter.

While the invention has been described in considerable detail, the invention is not to be limited to the particular embodiments above described, and it is intended to cover hereby all novel adaptations, modifications, and arrangements thereof which come within the practice of those skilled in the art to which the invention relates.

What I claim is:

1. A method for producing decorative effects in the surface of a body of cellular plastic material which material can be dissolved by a solvent, said method comprising the steps of: (1) applying a pigment-containing evaporable solvent for said plastic to a defined area of such surface at a predetermined and substantially uniform volume per unit of surface area to dissolve the plastic material constituting the walls of the cells of said material adjacent the surface of said area and to form a depression in such surface corresponding to said defined area, whereby a solution of said solvent and said plastic wall-forming material flows as a liquid surface layer for such depression and for the irregularities in the surface thereof resulting from the collapse of the cells; (2) heterogeneously scattering plate-like particles of material that is insoluble in said solvent and said solution and that has highly light reflective surfaces onto said liquid surface layer while said liquid surface layer is in a tacky condition to bond and partially to embed said particles therein at random angles relative to the general surface of said depression and (3) evaporating said solvent thereby solidifying said liquid surface layer and adhering said particles to the depressed area of the cellular plastic material.

2. The method of claim 1 wherein the cellular plastic material is foamed polystyrene.

3. The method of claim 2 wherein the plate-like particles are glitter.

References Cited by the Examiner

UNITED STATES PATENTS

| | | | |
|---|---|---|---|
| 1,149,974 | 8/15 | Chisholm | 117—31 X |
| 2,345,376 | 3/44 | Bodle et al. | 117—33 |
| 2,506,165 | 5/50 | Mountcastle | 117—31 X |
| 2,572,719 | 10/51 | Ginell et al. | 264—341 X |
| 2,663,911 | 12/53 | Waag et al. | 117—10 X |
| 2,953,469 | 9/60 | Fox | 117—33 X |

OTHER REFERENCES

"Why Santa Uses More Plastics," Modern Plastics, vol. 27, No. 12, August 1950 (pp. 55–60 relied upon).

WILLIAM D. MARTIN, *Primary Examiner.*